United States Patent
Pätz et al.

(10) Patent No.: US 6,550,852 B2
(45) Date of Patent: Apr. 22, 2003

(54) SOLAR COVER

(75) Inventors: Werner Pätz, Hofstetten (DE); Helmut Teschner, Finning (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/854,900

(22) Filed: May 15, 2001

(65) Prior Publication Data

US 2002/0008411 A1 Jan. 24, 2002

(30) Foreign Application Priority Data

May 15, 2000 (DE) .......................... 100 23 543

(51) Int. Cl.⁷ .................................................. B60J 7/00
(52) U.S. Cl. .................................. 296/211; 296/216.09
(58) Field of Search ........................... 296/211, 216.06, 296/216.09

(56) References Cited

U.S. PATENT DOCUMENTS 4,925,237 A * 5/1990 Bohn et al. ............ 296/216.09
6,151,834 A * 11/2000 Oami et al. ......... 296/216.06 X
6,155,635 A   12/2000 Wecker

FOREIGN PATENT DOCUMENTS

| DE | 3425104 | * | 1/1986 | ................ 296/211 |
| DE | 197 16 389 C1 | | 9/1998 | |
| JP | 213518 | * | 12/1984 | ................ 296/211 |

* cited by examiner

*Primary Examiner*—Dennis H. Pedder
(74) *Attorney, Agent, or Firm*—Nixon Peabody LLP; David S. Safran

(57) ABSTRACT

In a solar cover (14) for a motor vehicle roof (10) with an outside pane (20), an inside cover (18) and a plurality of solar cells (16) which are located between the outside pane and the inside cover, both the outside pane and also the inside cover being made of plastic, the outside pane (20) or the inside cover (18) is formed of an injection molded part (34) which has reinforcement and/or attachment elements (24, 29, 32) which are made in one piece with the outside pane (20) or the inside cover (18).

16 Claims, 2 Drawing Sheets

SOLAR COVER

BACKGROUND OF THE INVENTION

1. Field of the Invention

This invention relates to a solar cover for a motor vehicle roof with an outside pane, an inside cover and a plurality of solar cells which are located between the outside pane and the inside cover, both the outside pane and also the inside cover being made of plastic.

2. Description of Related Art

One such solar cover is known from DE 198 13 324 corresponds to U.S. Pat. No. 6,155,635 which describes a solar cover in which, between an essentially flat outside cover plate and an essentially flat inside cover, there is a plurality of solar cells. The cover plate is preferably a glass plate, but can also be a plastic plate made, for example, of plexiglass (PMMA). The inside cover is preferably formed from a plastic film, but can also be made of metal or glass. Published German Patent Application No. DE 198 13 324 A1 corresponds to U.S. Pat. No. 6,155,635 and discloses two embodiments of the solar cover, a frameless one and alternatively one with an additional peripheral solid plastic profile frame. In the frameless embodiment the stability of the solar cover is determined mainly by the cover plate which must be made correspondingly thick, and thus, heavy in order to impart to the cover sufficient stability. The alternative embodiment in production requires the additional working step of peripherally foaming the cover to the plastic frame.

Furthermore, published German Patent Application DE 197 16 389 A1 discloses a solar cover for a motor vehicle roof in which, between an inside plastic support and an outside glass cover layer, there is a plurality of solar cells which are embedded in an adhesive layer. To reduce the weight of the solar cover, the glass cover layer is made extremely thin so that it performs essentially only the function of a scratch-resistant protective cover for the solar cells. According to published German Patent Application DE 197 16 389 A1, a relatively lightweight cover can be produced, but the risk of damage to the cover is relatively high because the thin glass cover layer is not sufficiently supported by the underlying flexible adhesive layer when pressure is exerted from above on the solar cover, for example if a falling article should hit the cover or someone supported himself on the cover.

SUMMARY OF THE INVENTION

A primary object of this invention is to devise a solar cover of the initially mentioned type, which is light and still stable and which can be produced in a few working steps.

In a solar cover for a motor vehicle roof with an outside pane, an inside cover and a plurality of solar cells located between the outside pane and the inside cover, both the outer pane and also the inside cover being made of plastic, this object is achieved in accordance with the invention in that the outside pane or the inside cover is formed by an injection molded part which has reinforcement and/or attachment elements which are made in one piece. Because, on the one hand, both the outside pane and also the inside cover as such are made of plastic, and on the other hand, the reinforcement or attachment elements, which in existing roofs were separate components conventionally made of metal, are produced in one working step in the injection molding of the outside pane or the inside cover, the weight of the solar cover made in accordance with the invention can be kept low and the resources which are otherwise required for installing the reinforcement or attachment elements, such as the material cost, tool cost and labor input, are saved.

Since, for reasons of stability and safety, the outside pane should be made clearly more stable than the inside cover which can be a film or a plate, with a thickness which is much less than that of the outside pane, the arrangement is preferably chosen such that the injection molded part forms the outside pane of the solar cover. In this way, an especially lightweight and still stable cover can be produced.

Furthermore, the weight of the solar cover made according to the invention can be kept low by the reinforcing elements which are made in one piece comprising a hollow section which can be for example a U section which runs along the side edge of the cover or a closed hollow section.

In another embodiment of the invention, the attachment elements, which are made in one piece, comprise means for attaching a seal, attachment elements for connection to the fixed motor vehicle roof, attachment elements for connection to a roof mechanism for moving the cover element, and the like. These components can be made in one working process in one piece with the injection molded part which forms the outside pane or the inside cover or can be molded in one piece onto the already pre-cast injection molded part.

Conventionally the solar cells can be embedded in a hot melt adhesive film, for example, ethylene vinyl acetate, or in a sealing compound, for which for example addition cross-linked bi-component silicone rubber can be used.

In the edge area of the outside pane there can be an opaque material, especially to prevent viewing of the reinforcement and/or attachment elements made in one piece from the outside or to cover printed conductors as are provided for making contact with the solar cells and for connecting the solar cell assembly to the vehicle electrical system of the motor vehicle.

The opaque material can be a colored layer or a region of opaque material which is injected onto the outside pane in another working process.

In order to protect the top of the outside pane against damage, especially against UV effects or scratching, it can be coated with a transparent protective varnish. Polysiloxane varnishes, "orcomers" or nanometer layers can be used as especially advantageous coatings.

One preferred embodiment of this invention is explained in detail below with reference to the attached drawings.

DETAILED DESCRIPTION OF THE INVENTION

Figure 1:
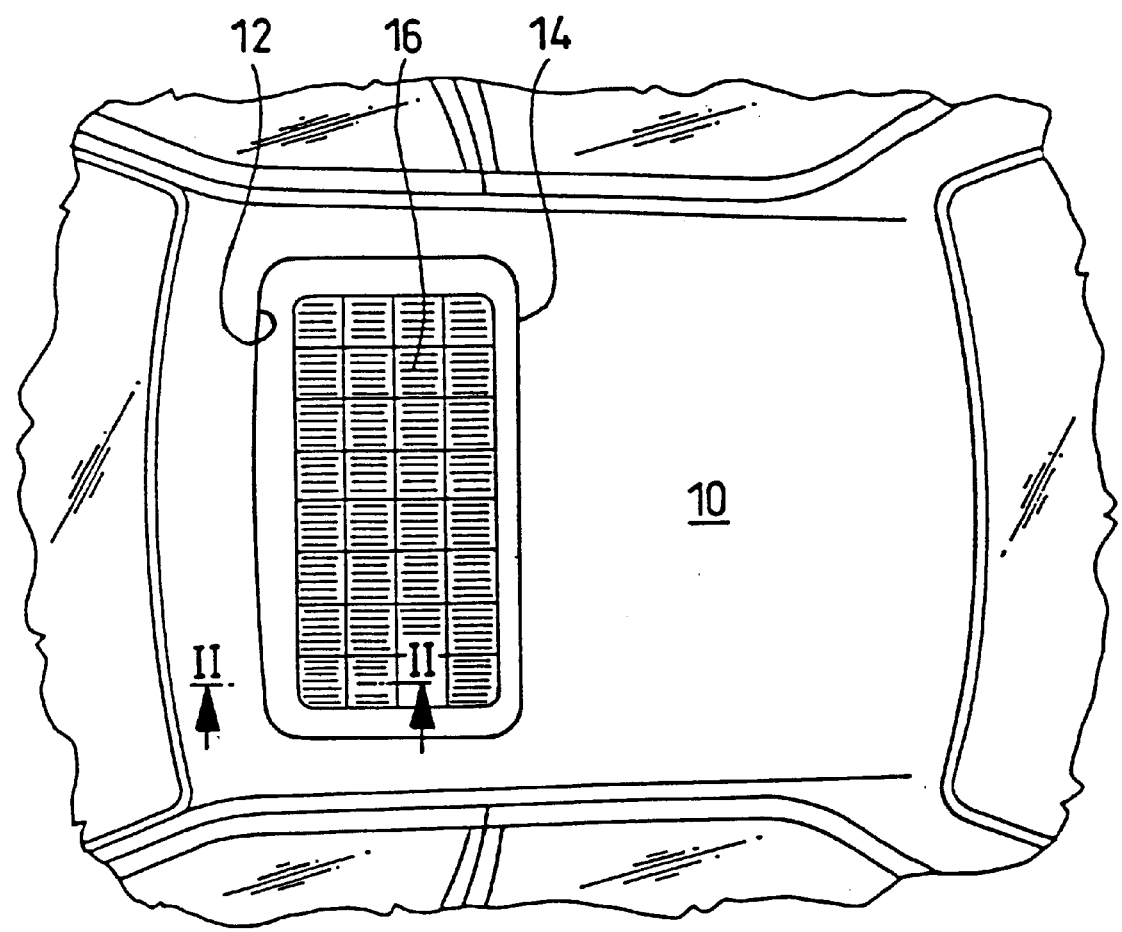
FIG. 1 is a plan view of a solar cover.

According to FIG. 1, in the fixed roof surface 10 of a motor vehicle roof, there is a roof cutout 12 which can be selectively closed or at least partially cleared by means of a solar cover 14. It goes without saying that the solar cover 14 described here can be part of an openable motor vehicle roof, for example, a sliding roof, a sliding and lifting roof, or a spoiler roof, or a fixed cover. The solar cover 14 has solar cells 16 over part of its surface, as can be seen with reference to FIG. 2.

Figure 2:
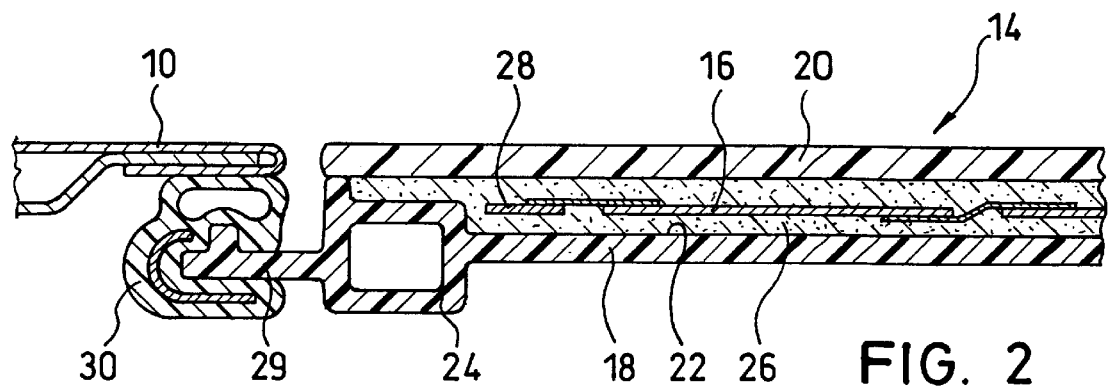
FIG. 2 is a sectional view of a first embodiment of the solar cover shown in FIG. 1.

FIG. 2 shows a sectional view of a first embodiment of the solar cover 14 shown in FIG. 1 and in which a plurality of solar cells 16 is located between the inside cover 18 and the outside pane 20. Both the outside pane 20 and also the inside cover 18 are made of plastic, the inside cover 18 being made as an injection molded part which defines the central support surface 22 for the solar cells 16 and having a reinforcing frame 24 which is molded on in one piece and which runs along the edge of the solar cover. Preferably, the support surface 22 is made trough-shaped as shown and holds the solar cells 16 embedded in a transparent sealing compound or hot melt adhesive film 26, including the solder connectors 28 which connect the solar cells. Furthermore, attachment elements 29 for attaching a seal 30 are molded onto the reinforcing frame 24, and by means of the seal, the solar cover 14 is sealed against the fixed roof skin 10.

Figure 3:
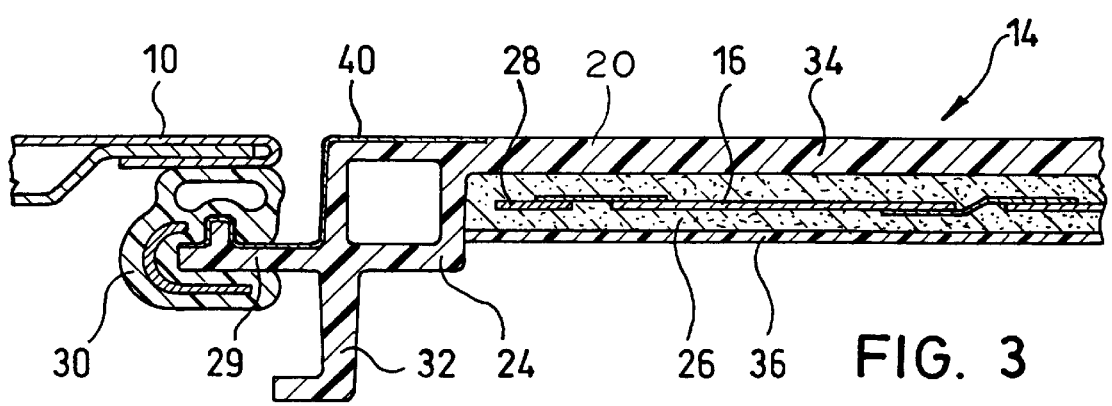
FIG. 3 shows a sectional view similar to FIG. 2 of a second embodiment of the solar cover shown in FIG. 1.

In the version of the solar cover which is shown in FIG. 3, the injection molded part 34 forms the outside pane of the solar cover, on the bottom of which, when the cover is installed, the solar cells 16 are placed and embedded in a sealing compound 26. Towards the vehicle interior, the solar cell assembly is covered by means of a film or a thin plate 36. Analogously to the embodiment as shown in FIG. 2, the injection molded part 34 has a peripheral reinforcing frame 24 and attachment elements 29 for attaching a seal 30. In addition, the injection molded part 34, as shown in FIG. 3, has an attachment element 32 which is molded on in one piece in order to connect the solar cover to a roof-mounted mechanism for moving the cover (not shown); the movement mechanism itself forms no part of this invention and can be of any conventional construction for producing known types of movements.

Figure 4:
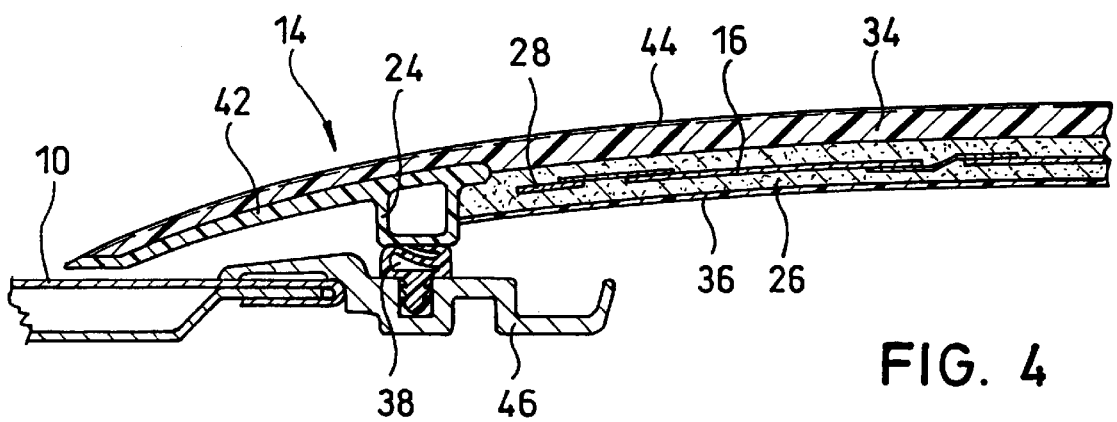
FIG. 4 shows a sectional view similar to FIG. 2 of a third embodiment of the solar cover shown in FIG. 1.

While in FIGS. 2 & 3 the solar cover 14 lies against the underside of the fixed roof skin 10, FIG. 4 shows another embodiment of the solar cover in accordance with the invention which is designed to adjoin the outer side of the fixed roof skin. In the solar cover shown here, the injection molded part 34, in turn, forms the outside pane of the solar cover on which the solar cells 16 rest when the cover is installed and are embedded in a transparent sealing compound 26. Towards the vehicle interior, the solar cell assembly is covered by means of a film or a thin plate 36. Similarly to the embodiments shown in FIGS. 2 & 3, the injection molded part 34 has a reinforcing section 24 near its side edge.

In the version shown in FIG. 4, the seal 38 which seals the cover 14 against the fixed roof skin 10 is not attached to the injection molded part 34, but to an edge frame 46 which is connected to the fixed roof skin 10. Similarly to the embodiment shown in FIG. 3, the injection molded part 34 can have means for attaching the cover 14 to the motor vehicle roof or to a mechanism for moving the cover.

Furthermore, in the embodiments shown in FIGS. 3 & 4, the edge area of the cover is colored to prevent viewing from the outside, i.e., from overhead, of the reinforcing frame, the attachment elements and the line arrangements for joining the solar cells 16 to the vehicle electrical system which are not shown in the drawings. As shown in FIG. 3, for this purpose an opaque colored layer 40 is applied to the edge area of the cover 14, while as shown in FIG. 4, this function is performed by an opaque area 42 which is injected on from underneath.

As indicated in FIG. 4, the top of the outside pane is advantageously provided with a protective varnish 44 which protects the pane against UV effects and scratching.

What is claimed is:

1. Solar cover for a motor vehicle roof comprising:

a transparent outside pane made of a one-piece injection molded plastic part;

an inside cover made of a plastic plate or film with a thickness which is much less than that of the outside pane; and a plurality of solar cells which are located between the outside pane and the inside cover, where the outside pane has reinforcement elements having a section formed of a closed cross-section hollow profile and attachment elements, both of which are integral parts of said one-piece injection molded plastic part.

2. Solar cover as claimed in claim 1, wherein the attachment elements comprise means for attaching a seal.

3. Solar cover as claimed in claim 1, wherein the attachment elements comprise means for attaching the solar cover to a motor vehicle roof.

4. Solar cover as claimed in claim 1, wherein the attachment elements comprise means for attaching the solar cover to a mechanism for moving the solar cover.

5. Solar cover as claimed in claim 1, wherein the solar cells are embedded in one of a hot melt adhesive film and in a sealing compound.

6. Solar cover as claimed in claim 1, wherein the inside cover is a film.

7. Solar cover as claimed in claim 1, wherein there is a opaque material in an edge area of the outside pane.

8. Solar cover as claimed in claim 7, wherein the opaque material is a colored layer applied on the edge area of the outside pane.

9. Solar cover as claimed in claim 10, wherein in the edge area there is a component of opaque material which is injected molded onto the outside pane.

10. Solar cover as claimed in claim 1, wherein an outer side of the outside pane is coated with a transparent protective varnish.

11. Solar cover as claimed in claim 1, wherein the attachment elements comprise means for attaching a seal.

12. Solar cover as claimed in claim 11, wherein the attachment elements comprise means for attaching the solar cover to a motor vehicle roof.

13. Solar cover as claimed in claim 11, wherein the attachment elements comprise means for attaching the solar cover to a mechanism for moving the solar cover.

14. Solar cover as claimed in claim 10, wherein the solar cells are embedded in one of a hot melt adhesive film and in a sealing compound.

15. Solar cover as claimed in claim 1, wherein the inside pane is the injection molded part.

16. Solar cover as claimed in claim 15, wherein the solar cells are embedded in one of a hot melt adhesive film and in a sealing compound.

* * * * *